June 15, 1971 H. SPUHLER 3,584,374
MACHINE TOOL WITH AUTOMATIC TOOL CHANGE
Filed Sept. 5, 1968 3 Sheets-Sheet 1

INVENTOR
HANSPETER SPÜHLER
By Wendroth, Lind & Ponack,
ATTORNEYS

June 15, 1971   H. SPUHLER   3,584,374
MACHINE TOOL WITH AUTOMATIC TOOL CHANGE
Filed Sept. 5, 1968   3 Sheets-Sheet 3
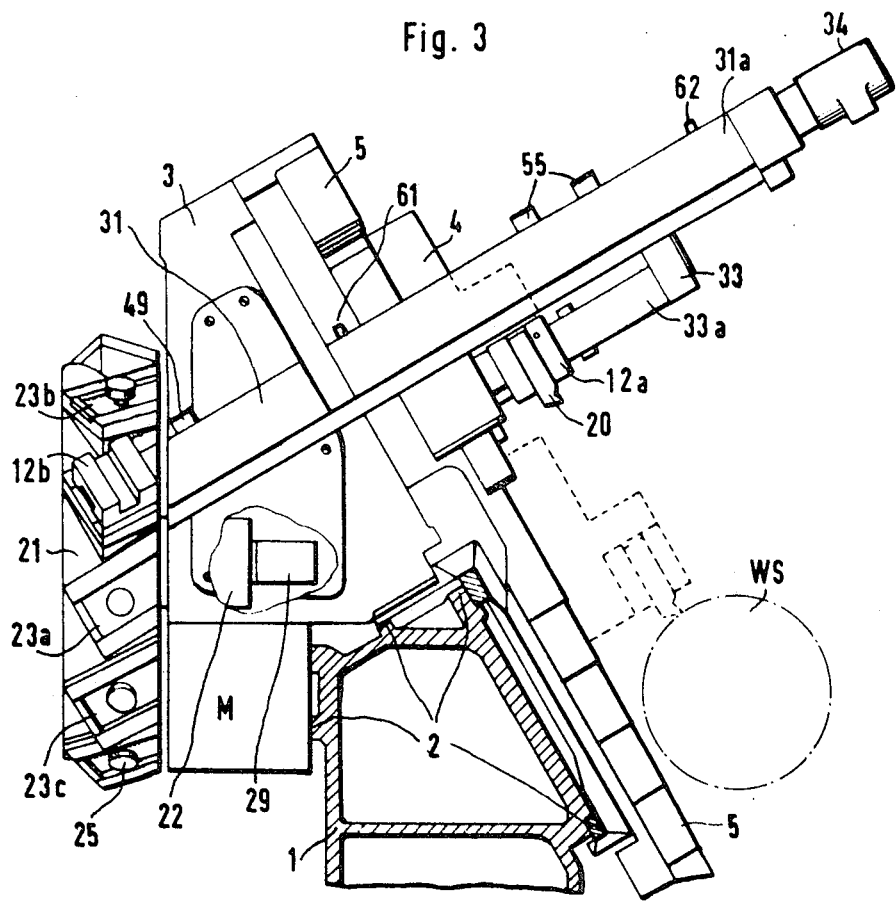
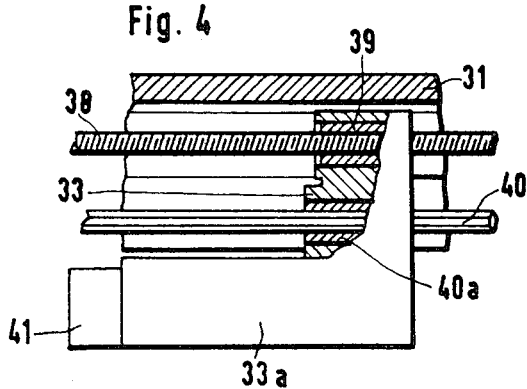
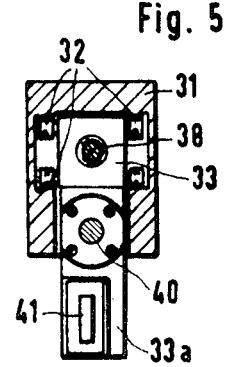
INVENTOR
HANSPETER SPÜHLER
By Wenderoth Lind & Ponack,
ATTORNEYS

United States Patent Office 3,584,374
Patented June 15, 1971

3,584,374
MACHINE TOOL WITH AUTOMATIC TOOL CHANGE
Hanspeter Spuhler, Litchfield, Conn., assignor to Werkzeugmaschinenfabrik Oerlikon-Buhrle AG, Zurich, Switzerland
Filed Sept. 5, 1968, Ser. No. 757,641
Claims priority, application Switzerland, Sept. 5, 1967, 12,404/67
Int. Cl. B23q 3/155; B23b 7/00
U.S. Cl. 29—568                                                3 Claims

ABSTRACT OF THE DISCLOSURE

Machine tool with tools fixed in holders having a rotatable drum magazine for storing a number of holders. Conveying means are provided for the automatic transfer of said holders in a predetermined sequence between the drum magazine and a working position of the tools. The holders are fixed in an interchangeable manner on the drum magazine and on a holder support which is disposed on a slide capable of sliding in one coordinate direction on a guiding part by means of a drive. The conveying means has at most a first and a second transfer path for said holders. The first path runs parallel to the direction of the coordinate of said slide and the second path is arranged on said guiding part being directed from said drum magazine mounted in said guiding part as a beginning point towards a common intersection point of said first and second transfer paths at which point two holders for exchange moved in common by a driver, change their transfer path and mutually change places in relation to the holder support and also to the driver which can be moved on the second transfer path by means of a second drive.

---

The invention relates to a machine tool with tools fixed in holders, with a rotatable drum magazine for storing a number of holders and with conveying means for the automatic transfer of the holders in a predetermined sequence between the drum magazine and a working position of the tools, the holders being capable of being fixed, in an interchangeable manner both on the drum magazine and also on a holder support disposed on a slide which can be moved in a co-ordinate direction on a guiding part by means of a drive.

A machine tool of this type is known, in the form of a lathe in which both a revolving drum magazine and a holder support are mounted on the cross-slide. The conveying means for the holder comprise the drum magazine and also a gripper arm rotatably mounted on the cross-slide and a turnable similarly rotatably mounted on the cross-slide as a holder support. In addition, the drum magazine and the gripper arm can be pushed backwards and forwards in the direction of their rotational axes. For the automatic transfer of the holders between the magazine and the support the following paths have to be travelled by the holders to be changed: (1) together with the magazine one of these holders has to be pushed in a straight line one and with the gripper arm the holder must likewise (2) be pushed in a straight line, in addition to which (3) this holder describes an arc outside on the gripper arm; further, the holder moves (4) on an arc round the centre of rotation of the turnable holder support. Thus a holder has to cover four different transfer paths on the cross-slide. In this connection the cross-slide itself also requires (5) to be fed in to the working point of the tool. The execution of these movements by the conveying members consequently also requires four, or rather five drive members and considerable space, so that mounting on the cross-slide becomes disadvantageously extensive and heavy and interferes with the view of the tool and the workpiece.

The object of the present invention is the creation of simplified conveying means and the simultaneous clearing of the cross-slide from the same. This is achieved in that the conveying means have at most two transfer paths for the holders, of which the first path runs parallel to the direction of the coordinate of the slide and the second path, arranged on the guiding part, is directed from the drum magazine mounted in the guiding part, as a beginning point towards a common intersection point of the two transfer paths, at which point two holders which are to be interchanged, moved together by a driver, change their transfer path and mutually change places in relation to the holder support and also to the driver, which can be moved on the second transfer path by means of a second drive.

It is preferable if the second transfer path can have a rectilinear course and cross with the first path, also rectilinear, at right-angles.

The arrangement of the conveying means in accordance with the invention gives advantages which have an advantageous and progressive effect on the expense and on the operation of a machine tool as compared with the known arrangement.

Instead of four different transfer paths in a sequence and a similar number of driving means for the holders, only two of these are now required. In this connection the inclusion, in the components constituting the conveying means, of the slide which can be moved in one co-ordinate direction—which is usually present in a machine tool in any case—for the first transfer path dispenses with the need for one of the two transfer paths as well as one of the two drive units. Thus it is a question of providing the second transfer path and a drive unit associated therewith for the tool change. A further advantage of the invention lies in the fact that the drum magazine and its drive, the drive unit of the slide carrying the holder supports and the remaining second feed path are shifted to the guiding part of this slide and thus the slide itself is freed from conveying means.

The arrangement is likewise simplified by a further feature of the invention which consists in the fact that the two transfer paths are preferably rectilinear and can intersect at right angles. Furthermore, as is shown by the exemplified embodiment, the drum magazine can be disposed with advantage behind a horizontal machine bed with a rotational axis which is horizontal and at right angles to the latter, where it is out of the way.

A typical example of the application of the invention, a turning machine will be described in association with the drawing which follows and in which the figures are:

FIG. 3 is a representation of the conveying device in elevation and of the machine bed in cross-section with a tool holder on the driver in the change position and— in broken line—the cross-slide with the tool in the working position at the workpiece;

FIG. 4 the gripper carriage as driver of the tool holders in a conveyor channel, in partial longitudinal section;

FIG. 5 the gripper carriage in end face view with the conveyor channel in cross-section.

Figure 1:
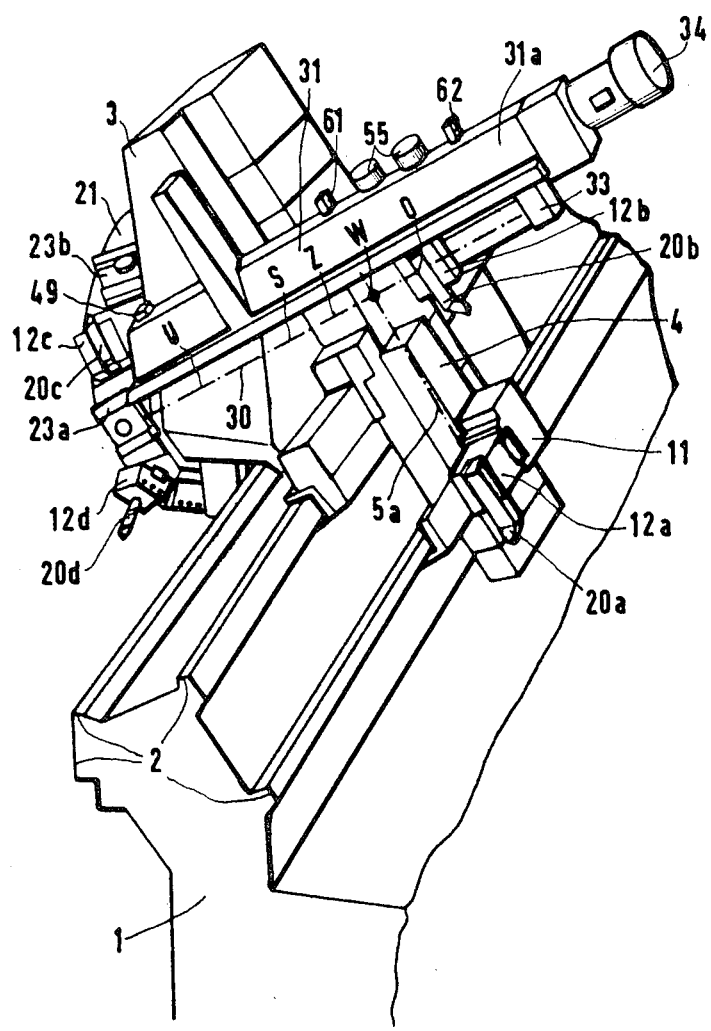
FIG. 1 is a perspective view of a portion of a turning machine in which the external appearance of the device for an automatic tool change can be seen.

The general view given in FIG. 1 shows a turning machine set up for automatic tool change. Mounted on horizontal guideways 2 of a machine bed 1, between a headstock and a tailstock (both omitted from drawing), is a longitudinal carriage 3 which can be moved backwards and forwards by a drive (not shown). A cross-slide 4—in general referred to as a slide—is situated on this longitudinal carriage 3—also referred to further on a carriage. The slide 4 on a slideway 5 which is straight, directed obliquely upwards at an angle of 60°, arranged at right angles to the guideways 2 and is protected from the chips, the longitudinal carriage 3 being constructed as a guiding part.

However, the invention can still be applied if the slideway 5 were directed not obliquely upwards but, on a differently constructed machine tool, at a different angle, e.g. horizontal or vertical.

The travel of the cross-slide 4 which has a special drive is limited by a lower and an upper end position.

The drives for the longitudinal carriage 3 and a workpiece chucked between the headstock and the tailstock (workpiece not shown in FIG. 1) can be provided in the conventional, known manner. It is assumed, however, that at least the drive for the cross-slide 4 is under automatic control. A feed control unit for this (see H in FIG. 2) which is suggested is one, for example, in the style of our U.S. patent application Ser. No. 685,513 filed Nov. 24, 1967.

Figure 2:
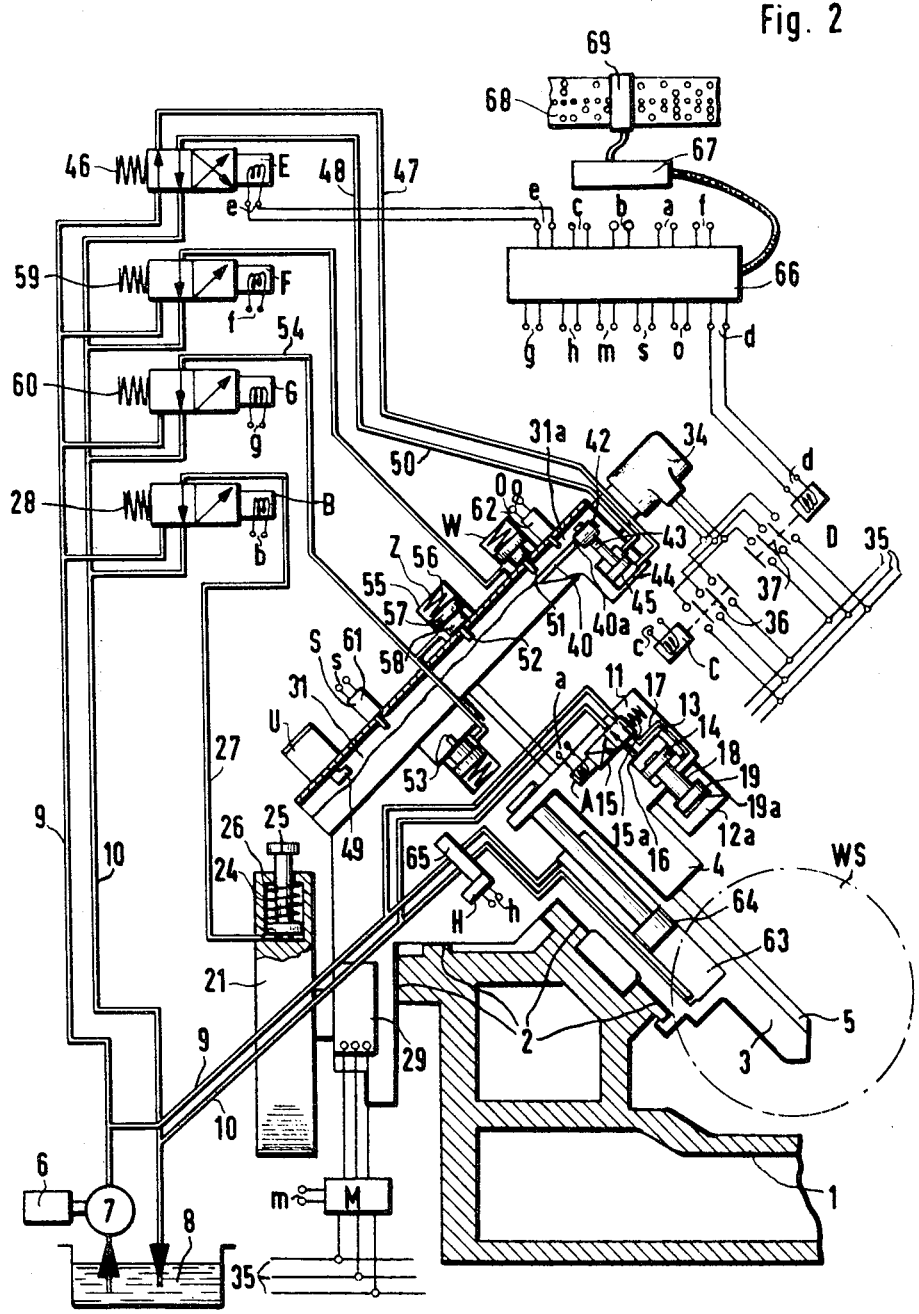
FIG. 2 is a diagrammatic representation of the hydraulic system and the electric control means, the latter with individual connecting leads omitted.

As is shown diagrammatically in FIG. 2 an oil pump 7 driven by an electric motor 6 feeds various hydraulic members with pressure oil from a reservoir 8, by way of the pressure pipes 9. The oil return is effected along the pipes 10 back to the reservoir 8. The cross-slide 4 is provided with a tool holder support 11—subsequently called simply "support"—in which is fitted a hydraulic, remote-controlled clamping device for interchangeable tool holders 12 or 12a, 12b, 12c . . . identifiable by coding. The latter will subsequently be called simply "holders." This clamping device consists, for example, of a cylinder 13 in which a double acting piston 14 can be acted upon, under the control of a control valve 15 by means of oil pressure via the supply lines 16 or 17, in one or the other direction alternately. The control valve 15 is connected with a solenoid A the input terminals of which are marked a. The piston rod 18 ends in a head 19 which fits into a uniformly shaped groove 19a in all the holders 12. Individually adjusted tools 20, or 20a, 20b, 20c . . . are clamped in the holders 12a, 12b, 12c . . . themselves (see FIG. 1).

It can also be seen, from FIG. 3, that behind the machine bed 1 there is a drum magazine—called simply "drum"—which is mounted in a bearing 22 fixed on the longitudinal carriage 3 so that it can rotate optionally under remote control about an axle which lies horizontally, at right angles to the guideways 2. Fitted to the periphery of the drum 21 at regular intervals are a number of seats 23 or 23a, 23b, 23c . . . on each of which a holder 12 is stored in readiness for change. Here there is also installed in each seat 23 a hydraulic, remote-controlled clamping device for the holders 12. For clamping, as can be seen from FIG. 2, a compression spring 24 loads a piston 25 in a cylinder 26 located in the drum 21, while for the release, oil pressure is provided on the opposite side of the piston 25. The oil pressure reaches the cylinder 26 via the pressure line 27 under the control of a control valve 28 which, in turn, is dependent upon the solenoid B coupled with it, the terminals of which are marked b. For the selection and sequence of the tools 20a, 20b, 20c . . . or rather their coded holders 12a, 12b, 12c . . . a drum driving motor 29 is placed under the influence of a detecting and switching instrument M with the instruction input m.

In addition to the drum 21 which travels with it the longitudinal carriage 3 (cf. FIG. 1) carries a conveyor channel 31, which also travels with it, for transferring the holders 12 on a transfer path 30 from the drum 21 to the support 11 on the cross-slide 4, which has travelled into the upper end position, and back again to the drum. This channel 31, in the present example, runs in a straight course from the drum 21 obliquely upwards to the right.

The channel 31 is situated at right angles both to the slideway 5 of the slide 4 and also to the guideways 2 of the carriage 3. The seats 23a, 23b, 23c . . . are located on the drum 21 in such a way that the seat which has come in for the removal and replacement of the holders 12, e.g. 23b, is precisely aligned in relation to the transfer path 30. A first transfer path of the holder 12, e.g. the slideway 5a of the support 11 on the slide 4, and the second transfer path 30 meet at a common intersection point, viz where the holder 12a to be transferred from the cross-slide 4 to the drum 21, which can be called "old" holder, and the holder 12b to be transferred from the drum 21 to a working position, which can be called the "new" holder in contradistinction to the "old" holder, assume an exchange position W.

As can be seen from FIGS. 4 and 5, there is arranged parallel to the transfer path 30 the conveying channel 31 which is open downwards and which contains four guide rails 32 for a gripper carriage 33 travelling on eight rolling bearings—subsequently referred to simply as gripper. As driver of the holders 12 this gripper 33 is equipped with an arm 33a and a coupling 41 mounted on the latter. The gripper 33 is driven by a reversible electric conveyor motor 34 flanged on to the end face at the top end 31a of the channel 31. Its remote controlled feed comes, as shown in FIG. 2, from the mains 35 by way of the swtiches 36 and 37 the solenoids C and D receive control instructions at the input terminals c and d. Mechanically connected with the conveyor motor 34 is a conveyor screw 38—called briefly screw—the bearings of which (not shown) are fitted at the two ends of the channel 31. As shown in FIGS. 4 and 5, this screw 38 passes through the gripper 33 which has an internal thread 39 and is thereby brought into driving connection with the screw 38.

Running parallel with the screw 38 is a hexagonal operating rod 40, likewise mounted at both ends of the channel 31. Like the screw 38, this also passes through the gripper 33 (FIGS. 4 and 5). In this, independently of the position of the gripper 33, it is in driving connection, by means of positive counter part 40a sliding on the operating rod 40, with a coupling 41 for the gripping and releasing of the holders 12. At the top end 31a of the channel 31 under the conveyor motor 34 there is a drive member for the backward and forward rotation of the operating rod 40 about its longitudinal axis which is provided for the remote operation of the coupling 41. At the end of the rod 40a there is a small toothed wheel 42 which meshes with a rack 43 (FIG. 2). The rack 43 in turn is mechanically connected with a hydraulic, remote controlled drive member. The latter has a cylinder 44 which is fixed to the conveyor channel 31 and in which a double-acting piston 45 can be subjected to oil pressure in one or the other direction. To this end a control valve 46 which can be operated by a solenoid E with the input terminals e is connected with the two oil supply pipes 47 and 48.

Stops 49, 51, 52, 53 are provided at various points along the conveyor channel 31, as shown in FIG. 2, and these constitute stopping points for the gripper 33.

These are:

(1) a reversing point U with the stop 49 immediately in front of the drum 21,
(2) the intersection, or change point W already mentioned, with the stop 51 which is hydraulically remote controlled by way of the pressure line 50,
(3) an intermediate point Z situated between these two stopping points U and W, with the two stops 52 and 53 which are likewise hydraulically remote controlled and connected to a common pressure line 54.

The three stops 51, 52, 53 are constructed in the same way: Fixed on the conveyor channel 31 in each case is a cylinder 55 in which a compression spring 56 loads a piston 57 unilaterally in such a way that its prolonged piston rod 58 projects into the channel 31 and forms the stop 51, 52 or 53 for the gripper 33. The opposite side of the piston 57 can be put under oil pressure for the withdrawal of the stop 51, 52 or 53. The two pressure lines 50 and 54 are each connected individually with an associated control valve 59 and 60, respectively. To each control valve 59 and 60 there is, again, associated a solenoid F and G with the input terminals $f, g$.

The conveyor channel 31 has, in addition, two stopping points S and O for the gripper 33 which are fixed by electric signalling agents, e.g. switches 61 and 62. Thus the switch 61, the connection terminals of which are marked $s$ determines:

(4) a starting and stopping point S from which the "empty" gripper 33 moves to the drum 21 to pick up a new holder e.g. 12b, 12c, or take it there at the end of the cycle.

(5) The switch 62, the connection terminals of which are marked $o$, is placed at the top end 31a of the channel 31 and determines a stand-by and reversing point O for the gripper 33 which is reversing its direction of motion at this point.

For the hydraulic drive of the cross slide (see FIG. 2) a cylinder 63 with a double-acting piston 64 is provided in the longitudinal carriage 3. Between the pump 7 and this cylinder 63 is a control member 65 which is acted upon by the special feed control unit H for the cross slide 4 which was mentioned at the beginning. The input terminals of this unit are marked $h$.

All the above-mentioned input terminals $a$ and $g$ of the solenoids A to G as well as the connection terminals $h$, $m$, $s$ and $o$ of the other remote controlled feed means H, M, S and O are connected with an automatic control 66 which gives instructions for the tool exchange procedure. For the sake of clarity, only the connection leads $d—d$ and $e—e$ are shown in FIG. 2. The automatic control 66 is in turn dependent upon an instruction centre 67 which analyses the machining programme for the workpieces WS to be machined. The machining and exchange programme itself is stored, for example, on a punched tape 68 which is sensed by a punched tape reader 69 and which transmits the information to the instruction centre 67.

To give a better understanding of the arrangement and manner of operation of the invention, a description follows showing the normal case of the course of the cycle for exchange, i.e. transfer of two tools 20, or rather holders 12, from the drum 21 to a working position and back to the drum, with reference to FIG. 2.

It is assumed, as the starting situation, that the oil pump 7 is operating. Also that there is a tool holder 12a clamped on the cross-slide 4 on the support 11 in engagement with a workpiece WS. In this case the solenoid A is dead, i.e. the spring 15a has brought the control valve 15 into the illustrated position. As a result the side of the cylinder nearest the holder 12a is put under pressure, the opposite side being free from pressure, which clamps the holder 12a on to the support 11. While the tool 20a inserted in this holder 12a is working, and without any break in the turning work, a holder 12b with the tool 20b which comes next in order in the machining programme is brought into readiness by the drum 21. It is assumed that the drum motor 29 has carried out the instruction received via the terminals $m$ and the detecting and switching device M, to find the required holder 12b and has turned a corresponding seat e.g. 23b to a position in front of the transfer path 30. The exchange cycle is thus about to commence. The gripper 33 finds itself "empty," i.e. without a holder 12 coupled to it, ready to start at the point S, that is to say that of the switch 61. The solenoid E for the coupling 41 on the gripper 33 is energized; the coupling is disconnected.

In the first phase of the tool change, the gripper 33 is released by the automatic control 66 via the connection terminals $s$ at the starting point S for its descent towards the drum 21. At the same time the solenoid D is energized via the terminals, or connecting leads $d—d$, closes the switch 37 and thereby connects the conveyor motor 34 to the mains 35 with the direction for downward travel. When the stop 49 is reached the connection $d—d$ is again cut-off by the automatic control 66, i.e. the conveyor motor 34, and with it the gripper 33, comes to a stop. In this position of the gripper 33 the gripper coupling 41 is already in engagement with the "new" holder 12b which is still on the seat 23b and now has to couple this on. The solenoid E is therefore switched off the automatic control again, i.e. the rack 43 and pinion 42 rotate the operating rod 40. The coupling 41 grips the holder 12b and the coupling-on is thus completed. The solenoid E remains switched at first, i.e. the holder 12b continues to be held, for the transfer operation, on the gripper 33. The holder 12b now has to be released from its seat 23b. To this end the solenoid B is energized, the control valve 28 is moved to the left and pressure oil flows into the clamping device of this seat 23b, raising the piston 25 against the compression spring 24 and releasing the holder 12b.

The next phase is the withdraw 1 of the stops 53, 52 and 51 out of the range of travel of the gripper 33 in the conveyor channel 31 by the energizing of solenoids G and F and the arrival of pressure oil under the pistons 57 of the stops 53, 52 and 51. Furthermore the switch 61 has to be rendered inoperative. The solenoid C is then made live so that the conveyor motor 34 is switched on with the "upwards" direction of rotation for a period of time until the gripper 33 together with the "new" holder 12b has reached the top limit position 31—i.e. the stand-by position O—and the switch 62 has acknowledged its arrival there to the automatic control 66; the solenoid C thereby switches the conveyor motor 34 off again. Here the gripper 33 waits with the holder 12b for the next phase.

The next phase is instructed by the processing programme for the workpiece, i.e. the instruction centre 67. That is to say, as soon as the work of the tool 20a, or its holder 12a on the cross-slide 4 is ended, the cross slide 4 moves out of engagement with the workpiece WS through the influence of its control valve 65 via the input $h$ and through the supply of pressure oil to the under side of the feed piston 64. The holder 12a on its transfer path 5a (see FIG. 1) comes into the top end position of the cross slide 4, i.e. into the change position W where its feed control unit H is switched off again via the input terminals $h$. Arrived there, the solenoid A is supplied with current, which brings the piston 14 of the clamping device in the support 11 into the release position and frees the holder 12a. The solenoid D then switches the conveyor motor 34 on again in the "downwards" direction. The "new" holder 12b is thereby pushed against the "old" holder 12a and, now guided on the conveyor channel 31, moves it a short distance downwards therein, where it is halted at the stop 53 since the solenoid G has in the meantime been switched off again and the springs 56 have pushed the piston rods 57 forwards. Thus the stop 53 now fixes the "old" holder 12a. The gripper 33 then reaches the stop 51 at W, the extended piston rod 58 of which is also forward again because the automatic control 66 has ensured that in the meantime the solenoid F has been switched off shortly before the arrival of the gripper 33 at the point W. When it arrives the solenoid D is simultaneous switched off in consequence of which the conveyor motor 34 and the gripper 33 stop again.

Since the support 11 on the cross slide 4, now free from the "old" holder 12a, has not yet left the change position W in accordance with the programme, the new holder 12b with its nut 19b is already pushed into the clamping device of the support 11, i.e. the "new" holder 12b has just changed its transfer path and place on the holder support 11, or on the gripper 33 respectively, with the "old" holder 12a. The "new" holder 12b now has to be uncoupled from the gripper 33 and clamped on to the support 11 of the cross slide 4. The automatic control 66 therefore switches the current supply on to the solenoid E again and solenoid A is switched off. Before the cross slide 4 with the "new" holder 12b travels away to the working position the gripper 33 must first be withdrawn a short distance with its coupling 41, entirely out of the "new" holder 12b. This necessitates the switching on of the conveyor motor 34 with the "upwards" direction of rotation. For this purpose current is again supplied to the solenoid C and the switch 36 switches the conveyor motor 34 on. Shortly afterwards, when the coupling 41 is far enough from the holder 12b, the solenoid C is switched off again. Only now may the feed control unit H for the cross-slide feed receive an instruction via its input h to leave the change position W. In accordance with the working programme of the workpiece the cross slide 4, and possibly also the longitudinal carriage 3 with the new tool 20b, or holder 12b, moves into engagement with the workpiece WS and the turning work proceeds immediately. Meanwhile the "old" holder 12a has to be transferred back to the drum 21.

The next phase consists in switching on the solenoid D as a result of which the conveyor motor 34 moves the "empty" gripper 33 downwards as far as the stop 52 of the intermediate point Z. The solenoid D is then switched off again. The coupling 41 of the gripper 33 has thereby already moved into the "old" holder 12a. Now the "old" holder 12a has to be coupled on. For this, current is cut off from the solenoid E so that the operating rod 40 turns back and the coupling is brought into the gripping position. For the further travel of the gripper 33, together with the "old" holder 12a the solenoid G is supplied with current; in consequence the two stops 52 and 53 drop back. The solenoid D then starts up the conveyor motor 34 again for "downwards" travel. On arrival at stop 49 the motor switched off by solenoid D. The "old" holder 12a has now arrived at the periphery of the drum 21 on the seat 23b at the place occupied at the start of the cycle by the "new" holder 12b. By the switching off of the solenoid B and the switching on of the solenoid E, the "old" holder 12a is fixed on the seat 23b and the coupling 41 on the gripper 33 is released, i.e. the gripper 33 is now separated from this holder 12a. The withdraw 1 of the "empty" gripper 33 from the drum 21 begins after energizing of the solenoid C and associated switching on of switch 36 of the conveyor motor 34 for the upwards travel. When the starting, or stopping point S is reached, the solenoid C opens the switch 36 again, i.e. the conveyor motor 34 stops. The gripper 33 is "empty" and ready to start the next tool exchange at the initial starting position.

For the final phase in the tool exchange cycle the drum 21 has to present the next tool, e.g. 20c, or a next holder 12c in the sequence in the readiness position. So in the instruction centre 67 the determination of the coding identification of this next holder 12c takes place from the machining programme. After the appropriate information has been transmitted via the terminal connection m—m to the detecting and switching device M, the drive motor 29 is caused to rotate the drum 21 into the predetermined position. The drum 21 remains fixed in this position. The cycle is thus terminated. The gripper 33 at once starts on the next cycle, i.e. to pick up the tool 20c, or holder 12c, at the drum magazine 21 and to transfer it to the stand-by position O where the instruction for tool change is awaited.

I claim:

1. Machine tool for machining a workpiece comprising a machine bed, a longitudinal carriage which is slidable on a guideway of the machine bed and which has a rear end away from the workpiece, means for the automatic tool exchange on said carriage comprising a drum for storage of a plurality of tool holders, said drum being rotatable around a horizontal axis and being fastened on said rear end of said longitudinal carriage, a slideway fastened on said longitudinal carriage, a cross slide displaceable on said slideway whereby said tool holders can be fastened directly on said cross slide, a guide rail fastened on said longitudinal carriage, a gripper displaceable on said guide rail for the transfer of tool holders from said drum to said cross slide, said guide rail starting from said drum running perpendicular to said slideway and transversely, said guide rail being set perpendicular to said slideway and transversely, whereby said guide rail and said slideway are set perpendicular to said guideway of the machine bed.

2. Installation for the automatic tool change on a machine tool comprising a magazine, a plurality of tool holders arranged in said magazine, a guide rail, a gripper which can be displaced on said guide rail from a delivery position (U) to a stand-by position (O) and vice-versa for transferring a tool holder out of said magazine into the stand-by position (O), a cross slide onto which can be fastened said tool holders, a tool holder displaceable by said cross slide from a working position into a change position (W) and vice-versa, said change position (W) being located on said guide rail between delivery position (U) and stand-by position (O), so that for changing tools a first tool holder is held by said gripper in the stand-by position (O) and a second tool holder fastened onto said cross slide is in the change position (W), and when said displacement of said gripper occurs from the stand-by position (O) to the delivery position (U) said first tool holder passes from the stand-by position (O) into the change position (W) and the second tool holder is pushed into an intermediary position (Z) located between the change position (W) and the delivery position (U), means for clamping the first tool holder onto said cross slide, means for loosening the first tool holder from said gripper and means for clamping the second tool holder onto said gripper when said gripper is in the intermediary position (Z).

3. Machine tool according to claim 1, wherein said guide rail and said slideway cross each other under a right angle, whereby said guide rail for said gripper from the drum runs diagonally upwards, and said slideway for said cross slide in relation to the horizontal line has an inclination of 60°.

References Cited

UNITED STATES PATENTS

| 3,186,085 | 6/1965 | Coate | 29—568 |
| 3,354,761 | 12/1967 | Sadier | 29—568X |
| 3,443,310 | 5/1969 | Burroughs et al. | 29—568 |
| 3,460,412 | 8/1969 | Clausen et al. | 29—568X |
| 3,466,739 | 9/1969 | Marman | 29—568 |
| 3,477,121 | 11/1969 | Martin | 29—568 |

ANDREW R. JUHASZ, Primary Examiner

Z. R. BILINSKY, Assistant Examiner

U.S. Cl. X.R.

82—34A